United States Patent [19]

Thijssen et al.

[11] Patent Number: 4,597,768

[45] Date of Patent: Jul. 1, 1986

[54] METHOD FOR TREATMENT IN COUNTER CURRENT OF SUSPENDED PARTICLES WITH A LIQUID

[75] Inventors: Henricus A. C. Thijssen, Son (N.B.); Gerardus J. Arkenbout, Zeist, both of Netherlands

[73] Assignee: Nederlandse Centrale Organisatie Voor Toegepast Natuurwetenschappelijk Onderzoek, The Hague, Netherlands

[21] Appl. No.: 506,330

[22] Filed: Jun. 21, 1983

[30] Foreign Application Priority Data

Jun. 22, 1982 [NL] Netherlands .......................... 8202518

[51] Int. Cl.[4] ............................................. B01D 9/04
[52] U.S. Cl. ........................................ 23/299; 23/301; 260/707; 260/DIG. 35; 422/111; 422/112; 422/251; 422/269; 62/532; 62/540
[58] Field of Search ...................... 23/295 R, 301, 299, 23/300; 260/707, DIG. 35; 62/532, 540; 422/105, 245, 110, 111, 112, 251, 261, 269; 210/634; 568/724, 750

[56] References Cited

U.S. PATENT DOCUMENTS

| | | |
|---|---|---|
| 2,617,274 | 11/1952 | Schmidt . |
| 2,816,938 | 12/1957 | Hess ..................... 260/707 |
| 2,854,494 | 9/1958 | Thomas . |
| 2,910,516 | 10/1959 | Rush ..................... 260/707 |
| 2,919,991 | 1/1960 | Ratje ..................... 422/251 |
| 2,986,587 | 5/1961 | Hess et al. ............. 422/245 |
| 3,212,281 | 10/1965 | McKay ................... 62/540 |
| 3,212,282 | 10/1965 | Stoller ................... 62/540 |
| 3,212,283 | 10/1965 | Jackson et al. ........ 62/540 |
| 3,218,818 | 11/1965 | Dale ....................... 62/540 |
| 3,222,880 | 12/1965 | Findlay .................. 260/707 |
| 3,232,069 | 2/1966 | Hawkins ................. 62/540 |
| 3,261,170 | 7/1966 | McCarthy et al. ..... 422/251 |
| 3,267,686 | 8/1966 | Holley .................... 422/251 |
| 3,394,189 | 7/1968 | West et al. ............. 210/634 |
| 3,582,286 | 6/1971 | Hozumi .................. 422/245 |
| 3,645,699 | 2/1972 | Brodie .................... 422/245 |
| 3,870,472 | 3/1975 | Adamski et al. ....... 422/247 |
| 3,895,958 | 7/1975 | Gill et al. ............... 422/273 |
| 3,947,499 | 3/1976 | Edwards et al. ....... 568/671 |
| 4,025,573 | 5/1977 | Hathway ................ 62/532 |
| 4,049,773 | 9/1977 | Mejdell et al. ......... 23/301 |
| 4,188,797 | 2/1980 | Thijssen et al. ........ 62/123 |
| 4,257,796 | 3/1981 | Arkenbout ............. 422/275 |
| 4,447,655 | 5/1984 | Mendiratta ............. 568/724 |

FOREIGN PATENT DOCUMENTS

| | | |
|---|---|---|
| 7002450 | 2/1971 | Netherlands . |
| 8000906 | 2/1980 | Netherlands . |
| 1427414 | 3/1976 | United Kingdom . |
| 2023564 | 1/1980 | United Kingdom . |
| 0679234 | 8/1979 | U.S.S.R. ................. 422/245 |

*Primary Examiner*—David L. Lacey
*Assistant Examiner*—Titus B. Ledbetter, Jr.
*Attorney, Agent, or Firm*—Brumbaugh, Graves, Donohue & Raymond

[57] ABSTRACT

A method for treating in counter current of suspended particles with a liquid, whereby the particles and the liquid are transferred in opposite directions through a contact zone which, at some places, spaced in axial direction, is stirred in planes perpendicular to the center line of the contact zone, in which the contact zone is one continuous space and that the volume fraction of the solid matter in the contact zone is maintained at a value between 0.20 and 0.55.

5 Claims, 7 Drawing Figures

METHOD FOR TREATMENT IN COUNTER CURRENT OF SUSPENDED PARTICLES WITH A LIQUID

The invention relates to a method for treatment in counter current of suspended particles with a liquid, whereby the particles and the liquid are transferred in opposite directions through a contact zone which, at some places separated in axial direction, is stirred in a plane perpendicular to the centre line of the contact zone.

Furthermore, the invention relates to an apparatus to carry out such a method, which apparatus consists of an oblong closed space, at the beginning provided with means for the supply of suspension and the removal of liquid, and at the end provided with means for the removal of suspension and the supply of liquid while further means are available to effect the transfer of solid matter and of liquid in opposite directions, and in the space some stirring means are mounted at planes separated from each other in axial direction, which stirring means stir in planes perpendicular to the centre line of the mentioned space.

Such a method and apparatus are known from Netherlands patent application 70,02450. This patent application describes a crystallization column in which a liquid and a crystallized phase are transferred in counter current. Transverse to the flow direction of the phases the interior of the column is divided into a number of mixing rooms by separation elements. These separation elements consist of plates provided with small and large openings. The small openings are substantially impermeable to the crystallized phase. The large openings are provided with valves being opened and closed with the same frequency with which a piston mounted in the column operates to generate a pulsating flow. When this flow is directed upwards, i.e. directed to the place where the crystal suspension is introduced into the column, the valves are closed and the liquid flows upwards through the small openings in the plates, while the suspension is concentrated against the under-surface of the plates. When, on the other hand, the flow is directed downwards, the valves are opened and crystal suspension flows downwards through the large openings. Each mixing room is provided with a stirring means, due to which an intimate contact between liquid and crystals is effected.

This known apparatus has the disadvantage that it is complicated and consequently expensive due to its large number of plates and valves, and the necessity of accurately adjusting the valve mechanisms of the different plates. Furthermore, the operation of this known column can be hampered in that the crystals grow on the plates due to which the openings in the plates get blocked. The cited Netherlands patent application therefore recommends special measures to prevent this growth.

The known column operates with a properly fluid suspension, i.e. a suspension with a volume fraction of solid particles of not more than about 0.2. In the cited patent application a volume fraction of solid particles of 5:60=0.083 is mentioned. The advantage of such a properly fluid suspension is that it is easy to stir. A disadvantage is, however, that a considerable mixing can occur in axial direction. In order to prevent this, it is necessary to separate the mixing zones by separation elements, viz. the said plates.

Another crystallization column operating with mixing zones separated by separation elements is described in applicant's Netherlands patent application 80,00906. In this column the separation elements consist of perforated plates of which the permeability to solid matter is changed periodically by making these plates to vibrate, whereby moreover balls are made to bump against the plates. Also in this known column the presence of complicated and consequently expensive separation elements between the mixing zones is necessary, not only on account of the fluidity of the suspension, but also because the vibration of the sieve plates and the movement of the balls promote mixing in axial direction.

Also methods and apparatus for the treatment of suspended particles with a liquid in counter current are known, whereby the fraction of solid particles in the column is so large that these particles form a packed bed so that no separation elements are required. With such methods and apparatus, e.g. described in U.S. Pat. Nos. 2,617,274 and 2,854,494, and British Pat. Nos. 1,427,414 and 2,023,564 good results have been obtained, among others due to the mixing in axial direction being very small. These methods and apparatus, however, also have serious disadvantages.

E.g. in case of concentrated crystal packing in the column a relatively high pressure and therefore much energy are required for maintaining the liquid flow through the crystal bed. Furthermore a high pressure and thus much energy are required for the transfer of the crystal bed against the liquid flow. This is valid particularly for columns in which the crystal transfer is effected by pressure (U.S. Pat. No. 2,617,274 and British Pat. Nos. 1,427,414 and 2,023,564) due to the wall friction becoming larger under influence of this pressure. In order to keep this wall friction within acceptable limits, high demands are made on the interior of the column.

The application of packed crystal beds in washing columns is limited in particular in case of operation with highly polluted mother liquors. The crystallization temperature of such a mother liquor is often 50°-75° C. lower than that of the pure main compound to be separated. This means that it must be possible in circumstances to heat the crystals in the column by 50°-75° C. This is only feasible if the heat required thereto is withdrawn from a washing liquid and as a consequence, part of the washing liquid crystallizes. Thereby sintering occurs in the packed bed, but this sintering must not be so strong that it results in a total or at least substantial closure of the channels in the packed bed. As the specific heat of most substances is about 1% of the melting heat, the maximum admissible temperature difference at a bed porosity of about 0.4 as occurs in a packed crystal bed, amounts to about 20° C. In a stirred bed no such limit exists as the crystals are kept loose from each other.

The object of the invention is to procure a method and an apparatus for treatment of suspended particles with a liquid in counter current, which method and apparatus do not have the above mentioned disadvantages of the known method and apparatus, or at least in a strongly reduced degree.

The invention is based on the observation that suspensions with a volume fraction of the solid matter between about 0.20 and 0.55 are pseudo-plastic, which means that such suspensions behave as a liquid when being stirred, but in rest as a plastic substance. When operating with such a pseudo-plastic suspension, on the one hand the transfer of the solid particles and of the liquid moving in counter current can be effected with a relatively low pressure and little energy and stirring can be done with relatively little energy, while on the other hand, by using non-stirred zones where the suspension behaves as a plastic substance mixing in axial direction can be prevented to a large extent, as a result of which the use of means to prevent axial mixing, like separation elements, become superfluous.

The invention, therefore, relates to a method of the kind indicated above for the treatment in counter current of suspended particles with a liquid, which method according to the invention is characterized in that the contact zone is one continuous space and that the volume fraction of the solid matter in the contact zone is kept at a value between 0.20 and 0.55.

Furthermore, the invention relates to an apparatus of the kind mentioned above for carrying out this method which apparatus according to the invention is characterized in that the closed space is a continuous space and that a control device is available to control the volume fraction of solid matter in this space.

In the method and apparatus according to the invention the transfer of solid matter and liquid is effected at a relatively low pressure and a low energy-consumption. This prevents the crystals from being deformed or damaged by big forces exercised thereon, while furthermore no high demands need to be made on the measurements of the column. Further, in case of crystallization with a strongly polluted mother liquor operation is possible without the risk of the crystal bed being sintered.

For the adjustment and maintenance of the desired volume fraction of the solid matter in the column a correct measuring of this volume fraction is essential. This can be done in different ways, e.g. by measuring the pressure drop over a section of the column, measuring by means of a dynamometer, the torque required for stirring the suspension in the column determining the concentrability of the crystal suspension, or calometrically. It is preferable, however, to measure the pressure under which liquid is fed to the contact zone, as this pressure is a measure of the value of the said volume fraction. On the basis of the measured volume fraction of the solid matter the desired value of this fraction can be adjusted e.g. by changing the quantity of solid matter removed from the column per unit of time. The device for the removal of solid matter may e.g. consist of a rotatable stirring means.

As at some places separated from each other in axial direction stirring devices are mounted which stir in planes perpendicular to the axis of the contact zone, an intimate mixing between solid matter and liquid occurs at the places of these stirring devices. Between these places of intimate mixing there are, however, places where the suspension is relatively in rest and, therefore, behaves somewhat as a plastic substance. As a result mixing in axial direction is prevented to a large extent and the use of separation elements, e.g. in the form of perforated plates, i.e. plates provided with small openings, is superfluous. The contact zone, thus, has the form of a continuous space, i.e. a space without partition walls.

The absence of separation elements in the contact zone does not only have the advantage of a cheap and simple construction, but it also eliminates the risk of blocking by an undesired crystal growth. For, when the apparatus according to the invention is used for separating a mixture of substances by crystallization, the operation of the column can, in a relatively simple way, be controlled in such a manner than the washing front, i.e. the place where the highest temperature and concentration gradients occur, is in the centre of the contact zone where no perforated plates are present. Growth on and consequently blocking of perforated plates occur in particular in the direct neighbourhood of the washing front. When this washing front is positioned at about the centre of the continuous space which is the contact zone, growth and blocking will not occur.

When the method and the apparatus according to the invention are applied for the separation of a mixture of substances by crystallization, a crystal suspension is supplied to the contact zone which crystal suspension is obtained by partial crystallization c.q. melting of the mixture of substances to be separated. For this purpose a device for partial crystallization, c.q. partial melting of the mixture of substances to be separated is—seen in the direction of the solid-matter transfer—positioned before the means for supplying suspension to the space. Furthermore, liquid obtained by melting a portion of the crystals removed from the contact zone can be supplied to the contact zone. For this purpose a device for melting and recycling to the closed space a portion of the removed crystals is—seen in the direction of the solid-matter transfer—positioned after the means for the removal of suspension or crystals.

Transferring the solid particles and the liquid in counter current through the contact zone can be effected with means known per se. Preferably, however, one plate is used of which the permeability to the solid particles is changed periodically and means for maintaining a pulsating flow in respect of this plate, whereby the frequency of the pulsating flow corresponds to that of the changing of the said permeability. The pulsating flow can e.g. be generated by a piston moving to and fro, but it is also possible to move the plate periodically up and down in respect of the liquid in the column, thus causing also a pulsating flow in respect of the plate.

The plate is preferably provided with small openings, the size of which is the same order of magnitude as the size of the solid particles in the suspension, and moreover with a small number of large openings. The surface of the large openings in the plate covers preferably 25–50% of the surface of the whole plate. The plate is furthermore provided with valves that can close the large openings. These valves are preferably opened and closed by a mechanical, electrical or pneumatical mechanism mounted outside the column, which mechanism as far as its frequency is concerned is coupled with means for maintaining a pulsating liquid flow.

In a preferred embodiment of the invention the valves are mounted at the side of the plate directed to the removal of the solid matter from the column and moreover carried out in such a way that they can also operate as scrapers and so can remove possible growths on the plate.

The apparatus according to the invention further comprises stirring means which stir the suspension in the column in radial direction, viz. at a number of places spaced in axial direction. As a result of the pseudoplastic properties of the suspension it behaves as a liquid at the place where it is stirred, and thus little energy is required. Between the places of stirring the suspension is relatively in rest and thus behaves more or less as a plastic material, due to which mixing in axial direction remains restricted.

In a preferred embodiment of the apparatus according to the invention the stirring means consists of a shaft which is mounted rotatable in and at least about coaxial with the space in the column and which shaft is provided over its length with radially protruding stirring means in the shape of pins. Such a stirring means is already known per se from U.S. Pat. No. 4,188,797. In the apparatus according to this U.S. patent specification there is, however, the risk that the mass to be stirred and the stirring means will rotate in more or less the same way so that the pins move hardly if at all in respect to the mass to be stirred and that no stirring effect occurs. In order to prevent this in the apparatus according to the invention the wall of the space in the column is provided at the inside with radially inwardly protruding pins.

The stirring device according to the invention described above does not only cause a homogenisation of the suspension in radial direction and the prevention of channel formation, but also an extension (in axial direction) of the washing front, i.e. of the area where the concentration and temperature gradients have maximum values. As a consequence, possible crystallization is effected in a more controlled way, and the crystals remains loose from each other, thus preventing sintering of the crystal mass.

Due to the pulsating liquid flow in the contact zone the concentration of the suspension therein changes periodically and consequently also the torque to be exercised on the stirring means. In a preferred embodiment of the method according to the invention there is no stirring when the suspension has its largest concentration, i.e. during that part of the pulse period in which the liquid flow is directed to the beginning of the contact zone. A considerable energy saving is thus obtained.

The course of the physical processes in the apparatus according to the invention can—if desired—be influenced by locally controlling the temperature in the apparatus. This can e.g. be effected by providing the apparatus locally with an isolating mantle or with heating or cooling elements, or by locally withdrawing substances from the apparatus and recycling them to the apparatus after heating or cooling.

The invention will now be explained with reference to the drawing.

Figure 1:
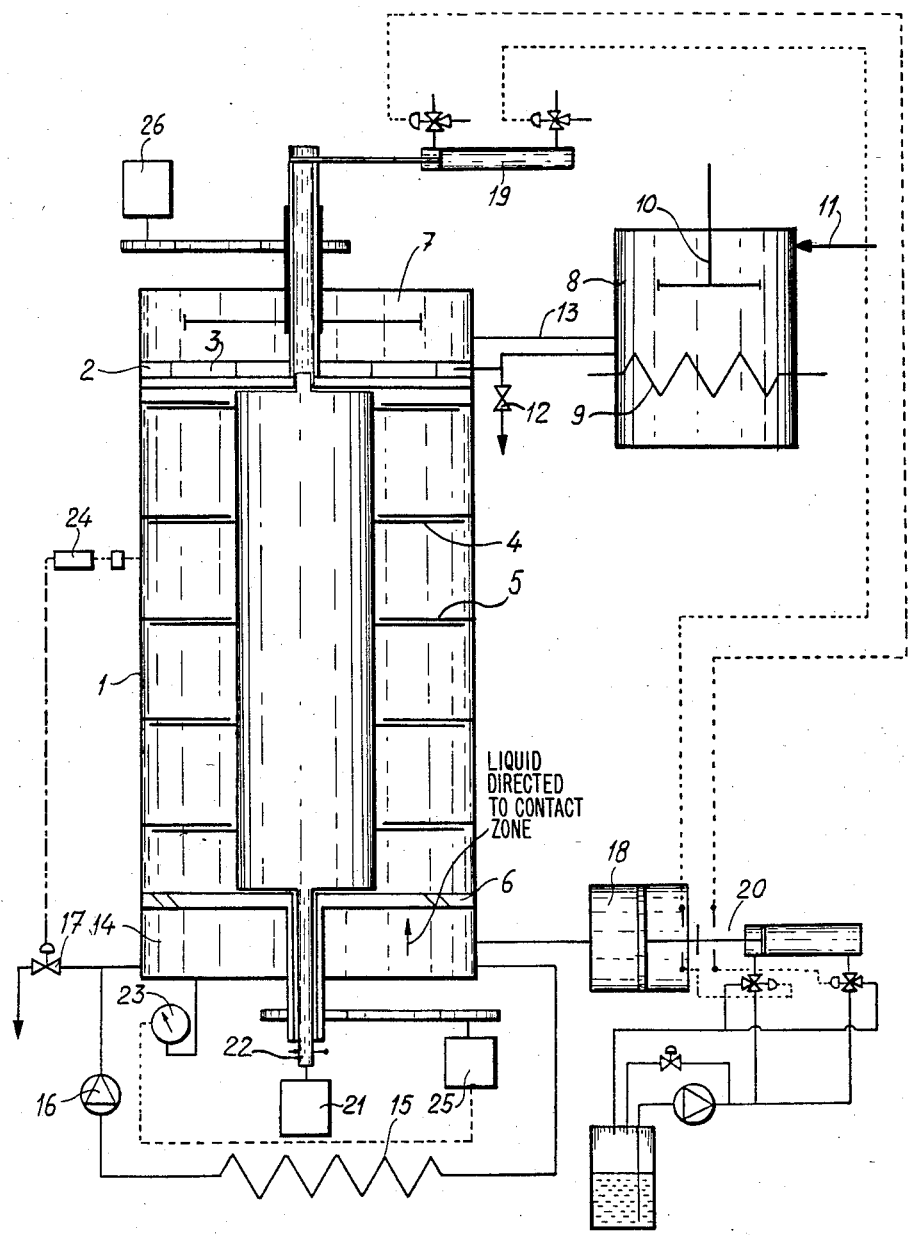
FIG. 1 shows a process diagram with the crystal washing (purification) apparatus according to the invention.

FIG. 1 shows a process diagram with an apparatus according to the invention. The crystal washing/purification column consists of a cylinder 1 of e.g. glass, in which at the suspension supply side a perforated plate 2 is fixed with a few large openings that can be closed by means of mechanically operated valves 3, a stirring device for tangentially moving the suspension, consisting e.g. of a rotatable shaft with rotor pins 4 and stator pins 5 fixed in the wall, and furthermore a rotating device 6 for the removal of the concentrated and washed solid matter, which device is provided with a drive 25. At the suspension-supply side the apparatus is provided with a mixing chamber 7 and the apparatus is connected with a crystallizer comprising a crystallization vessel 8 with a cooled and scraped heat exchanger 9 and a stirring means 10 therein. The mixture to be separated is introduced into the crystallizer through a line 11. Supply of suspension takes place through line 13. A waste flow is partly recycled to the crystallization vessel 8, while the rest is removed through a control valve 12.

The removed crystal suspension is caught in a washing chamber 14 and molten by circulation along a heat exchanger 15 by means of a pump 16. The molten crystal suspension is substantially removed through a removal device 17. Part of the molten suspension is recycled as reflux washing liquid into the purification device. The crystal removal side of the apparatus is also connected with a pulsating device 18 for generating the desired pulsating liquid movement.

The valves 3 in the perforated plate 2 are connected with an operation means 19 for its openings and closing. This opening and closing of the valves is coupled to the pulsating liquid movement by means of an operation means 20.

Between the drive 21 and the stirring device there is a dynamometer 22 to measure the torque. The measured value of the torque can be used for controlling. With a manometer 23 the liquid pressure in the washing chamber is measured. The pressure in the liquid chamber indicates the washing pressure of the washing liquid in counter current with the crystals. The higher the washing pressure, the more concentrated the crystal packing. The output of the manometer 23 can also be used for controlling. FIG. 1 indicates that on the basis of the washing pressure measured by manometer 23 the rotating removal device 6 with drive 25, and also the crystal removal, are controlled.

By means of control valve 24 the product remover is adjusted such that the washing front, i.e. the transitional zone with the steep temperature and concentration gradients, is adjusted in the desired place. The control of the place of the washing front can be based on e.g. a temperature measurement or a colour measurement. In the first case a plurality of thermo couples or platinum resistance thermometers mounted in the wall can serve as sensors. In the second case optical sensors can be applied. Finally, reference number 26 in FIG. 1 indicates the drive of the stirring means in mixing room 7.

The mass transfer in the washing/purification device is effected under influence of a pulsating liquid movement. When the liquid movement is averted from the suspension supply side to the suspension removal side, thus downwards in the drawing, the valves 3 are opened and suspension is sucked off from the crystallization vessel 8. At the same time concentrated suspension is removed by the rotating removal device 6.

When the liquid movement reverses and the liquid is moved in the direction of the suspension supply side, thus upwards in the drawing, the valves 3 are closed. The liquid is removed through the small openings in the plate, while the crystals are left back.

The volume fraction of the suspension can be adjusted within wide limits. The measure for the lower limit is the longitudinal mixing, easy to measure in the neighbourhood of the washing front where the concentration and the temperature gradients are steepest. The longitudinal mixing must be small.

The measure for the upper limit of the volume fraction of solid particles in the suspension is the criterion that the suspension must always be well flowable. A measuring of the size of the torque of the stirring means give a good measurement.

The value of the volume fraction of the solid matter to which the column is adjusted, will depend strongly on the nature of the suspension. In most cases the value of the concentrated suspension will be between 0.20 and 0.55. The desired value can be adjusted by choice of the volume fraction of the supplied suspension, the choice of the volume and the frequency of the liquid pulse movement, or a control of the crystal removal, e.g. by means of variation of the rate of rotation of the removal device.

The washing front zone with the steepest temperature and concentration gradients is adjusted to advantage at a place somewhere between the perforated plate and the place of the suspension removal.

The washing front is adjusted not too close to the perforated plate in order to prevent undesired crystal growth (crusting) on the plate. As crusting occurs already at slight oversaturations and slight temperature fluctuations, necessary precautions should be taken as e.g.
  good mixing around the plate
  making the heat capacity of the metal parts as low as possible
  good insulation of the component parts; in special cases an auxiliary heating can be applied as an addition.

Concentration of the crystal suspension to a packed bed can be prevented in the neighbourhood of the valves by:
  outward operation of the valves
  stirring right under and right above the plate
  scraping of the plate on the side against which the suspension is concentrated. Here the valves can act as scrapers.

Also an asymmetric pulsating flow movement can be used with advantage, whereby the flow velocity is relatively high when the suspension is supplied and low when the suspension is concentrated.

In a crystal transfer of 10,000 kg/m²/h and a volume fraction of 0.3 in the supplied suspension the flow velocity is 20 mm/sec. at an average.

The method can be realized with advantage in the annular space between two concentric cylinders. The diameter of the outer cylinder is then 1.25 to 3 times that of the inner cylinder. The inner cylinder rotates with a circumferencial velocity of e.g. 0.1-10 m/sec. Rotor pins or other stirring means are fixed to the inner cylinder.

On the outer cylinder the perforated plate with large openings and the stator pins are fixed. The large openings in the perforated plate can be closed with mechanically operated valves.

Figure 2A:
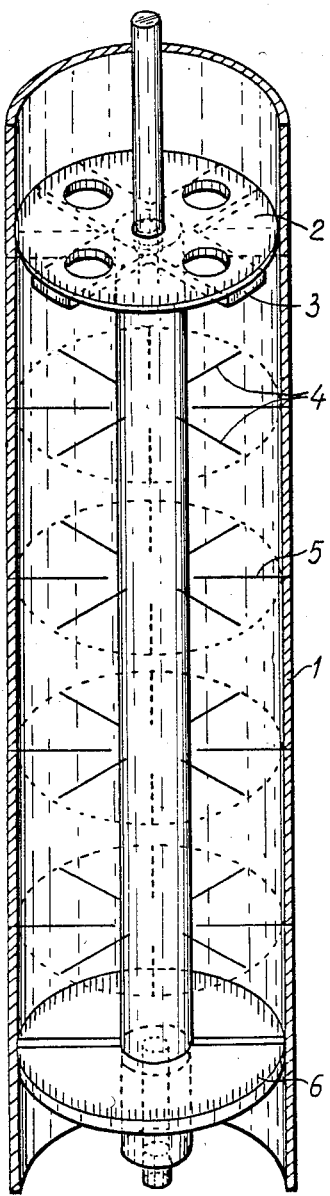
FIG. 2a shows, partly in cross section, the crystal washing/purification column.

FIG. 2a shows, partially in cross section, the crystal washing/purification column according to the invention, consisting of a cylinder 1, a perforated plate 2 with large openings which can be closed with valves 3, a rotatable shaft with rotor pins 4, stator pins 5 fixed in the wall, and a rotating suspension removal device 6.

Figure 2B:
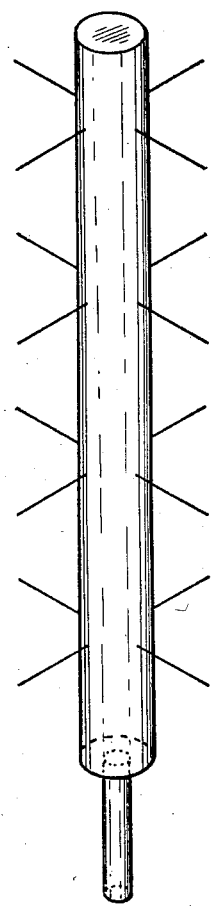
FIG. 2b shows the rotatable shaft with rotor pins.
Figure 2C:
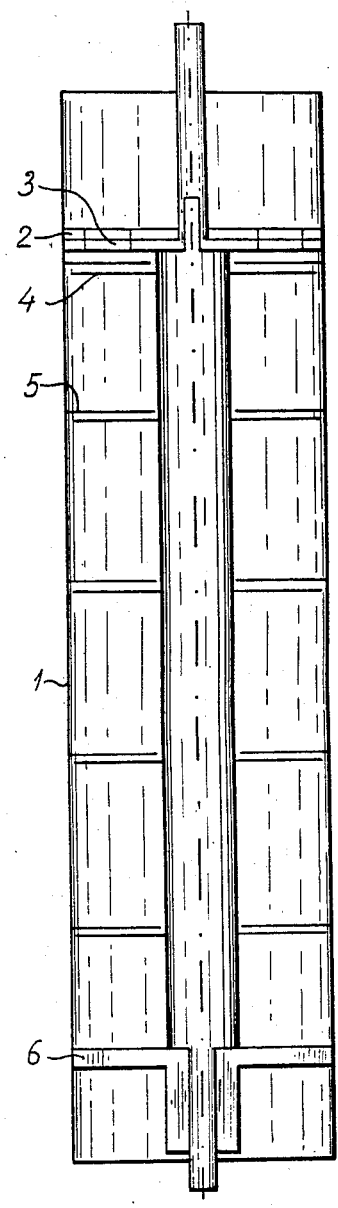
FIG. 2c is a diagrammatical longitudinal cross section of the crystal washing/purification column.

FIG. 2b shows the rotatable shaft with rotor pins and figure 2c a diagrammatical longitudinal cross section of the crystal washing/purification column.

Figure 3A:
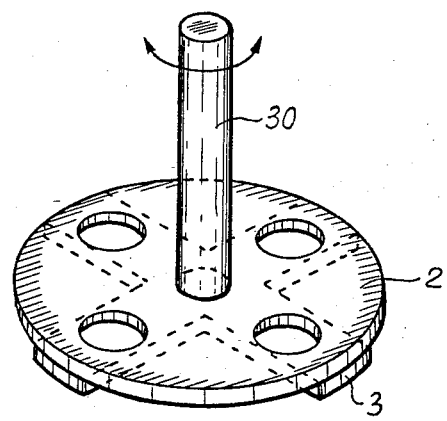
FIG. 3a shows the perforated plate with the valves in closed position.
Figure 3B:
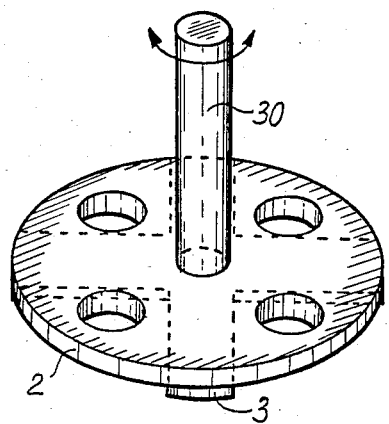
FIG. 3b shows the perforated plate with the valves in open position.

FIG. 3 shows the perforated plate 2 (the perforations are not shown) in which perforated plate 2 large openings are shown which openings can be closed by valves 3, and a connecting shaft 30 between the valves 3, and the operation means (not shown) for opening and closing the valves. In FIG. 3a the valves are closed and in FIG. 3b the valves are open.

In the embodiment of FIG. 3, valves 2 in open position substantially close the perforations. Valves 3 rotate right under plate 2 at the crystal removal side providing in this way also for a scraping movement at the side of plate 2 against which the suspension is concentrated. The small openings in the plate are of the same order of magnitude as the average size of the crystals. The openings can be a few times larger or smaller than the average size of the crystals which in general varies between 0.1 and 1 mm. The surface of the large openings in the plate is made as large as possible and amounts to about 25–50% of that of the plate.

Figure 4:
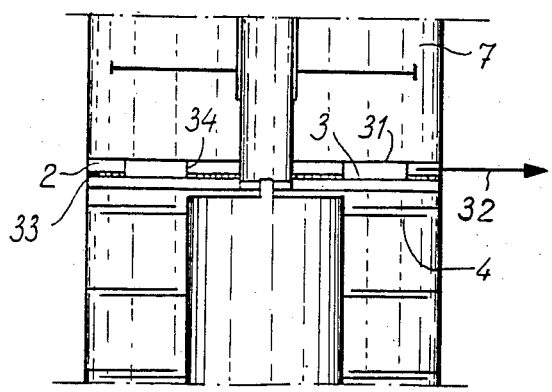
FIG. 4 shows a part of the apparatus in cross section, with separate removal of the mother liquor.

FIG. 4 shows a cross section of a portion of the apparatus according to the invention with a separate removal of the mother liquor. The composite plate 2 consists in this embodiment of a plate 33 with small and large openings and a plate 31 mounted at a short distance above it, which plate 31 has exclusively large openings corresponding with the large openings in plate 33 and connected with these by short tubes 34. In case of a downward liquid flow suspension flows through the open large openings in plates 31 and 33. In case of an upward liquid flow openings 31 and 33 are closed by valves 3; the liquid (mother liquor) comes through the small openings in plate 33 into the space between plates 31 and 33 and is removed from this interspace through line 32.

EXAMPLE

The purification of para-xylene was carried out in a separation installation which substantially corresponded to that shown in FIG. 1. The installation contained a crystallizer 8 and a crystal washing/purification column 1 according to the invention.

The crystallizer consisted of a simple, outwardly scraped and inwardly cooled heat-exchanger with a length of 500 mm and a diameter of 300 mm, positioned in a vessel with a length of 600 mm and a diameter of 500 mm.

The heat exchanger and the vessel were substantially of stainless steel. The washing column had a length of 500 mm and an inner diameter of 300 mm. The rotatable cylinder shaft had an outer diameter of 130 mm.

The washing column was built up of glass and stainless steel rings. The stator pins were fixed to the stainless steel rings.

The rotatable shaft comprised series of rotor pins in seven planes perpendicular to the shaft and spaced at 50 mm. Each series consisted of eight pins with a diameter of 8 mm.

On the outer wall series of stator pins were fixed in eight planes perpendicular to the wall. Each series comprised eight pins with a diameter of 8 mm. The perforated plate of stainless steel comprised four large openings, which could be closed by teflon valves. The diameter of a large opening amounted to 55 cm².

The diameter of the perforations in the plate was 2 mm and the open surface was about 25% of the plate surface.

The frequency of the pulsating liquid movement was about four times per minute, and the quantity of moved liquid per pulse about 3 kg.

The feed mixture consisted of para-xylene, polluted with 20% wt. of ortho-xylene, meta-xylene and ethylbenzene.

The temperature in the crystallizer was about −20° C. Of the total feed of 270 kg/h, 180 kg/h was crystallized, while 90 kg/h of non-crystallized liquid which still contained about 40% para-xylene was removed as waste flow at 12.

At the crystal removal side 240 kg/h of crystals was molten and about 180 kg/h carried off as 99.97% pure product (para-xylene).

A production of 180 kg/h yields at 8000 working hours per annum an annual production of 1440 tons. With larger apparatus of this type annual productions of 100,000 tons and more can be obtained.

We claim:

1. In a method for concentrating a suspension containing solid particles comprising the steps of:

moving said suspension through a contact zone having a central axis bounded by a wall;

moving a liquid through said zone countercurrent to said suspension, thus moving said liquid in the opposite direction of said suspension;

stirring said suspension in said contact zone, in regions which extend across an entire cross section of said contact zone and perpendicular to said axis, said regions being positioned at a plurality of locations spaced in the axial direction;

removing separated particles from said contact zone;

whereby a concentrated suspension is provided comprising providing the entire length of said contact zone with a substantially uniform cross-section along said axis and with an open space devoid of stationary baffle means that limit free mixing and circulation throughout said contact zone and the step of maintaining the volume fraction of the particles in the concentrated suspension in the contact zone at a value between 0.20 and 0.55 throughout the contact zone so that said suspension remains in a pseudo-plastic state.

2. The method according to claim 1, wherein the improvement further comprises determining the value of the volume fraction of the solid matter in the contact zone by measuring the pressure under which liquid is directed to the contact zone, which pressure is a measure of the value of the said volume fraction.

3. The method according to claim 1 or 2, wherein the improvement further comprises effecting the control of the volume fraction of the solid matter in the contact zone by varying the quantity of particles removed from the contact zone.

4. The method of claim 1 wherein the improvement further comprisies separating said particles from a mixture by means of crystallization by, prior to supplying said suspension to said contact zone, of subjecting said mixture to partial crystallization or melting to form said crystal suspension; and thereafter supplying said suspension to said contact zone, partial annd particles to be separated are in the form of crystals within said suspension.

5. The method of claim 4, wherein the improvement further comprises the step of melting a portion of the crystals removed from said contact zone and supplying the melted crystals as said liquid.

* * * * *

UNITED STATES PATENT AND TRADEMARK OFFICE
CERTIFICATE OF CORRECTION

PATENT NO. : 4,597,768

DATED : July 1, 1986

INVENTOR(S) : HENRICUS A.C. THIJSSEN ET AL.

It is certified that error appears in the above-identified patent and that said Letters Patent is hereby corrected as shown below:

Column 4, line 42, after "which is" insert -- in --;

Column 5, line 25, "remains" should read -- remain --;

Column 6, line 24, "openings" should read -- opening --;

Column 7, line 7, "give" should read -- gives --;

Column 9, penultimate line, after "provided" insert -- the improvement --; and

Column 10, line 27, "partial annd" should read -- wherein said --.

Signed and Sealed this

Twelfth Day of January, 1988

Attest:

DONALD J. QUIGG

Attesting Officer

Commissioner of Patents and Trademarks